US006252948B1

United States Patent
Okamoto (10) Patent No.: US 6,252,948 B1
(45) Date of Patent: Jun. 26, 2001

(54) TELEPHONE NOTE-TAKING DEVICE (75) Inventor: Masayoshi Okamoto, Ogaki (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 08/314,451

(22) Filed: Sep. 28, 1994

Related U.S. Application Data (63) Continuation of application No. 08/029,186, filed on Mar. 10, 1993, now abandoned.

(30) Foreign Application Priority Data

Mar. 13, 1992 (JP) ................................. 4-055216

(51) Int. Cl.[7] .............................. H04M 11/00; G06K 9/00
(52) U.S. Cl. ..................... 379/93.23; 345/173; 382/189
(58) Field of Search ................................ 345/115, 118, 345/119, 120, 145, 146, 157, 173, 179; 379/93, 94, 96, 92, 93.23, 110.01, 67.1, 71; 395/155, 161, 159, 326, 334, 335, 350, 358, 962, 615; 382/186, 187, 188, 190

(56) References Cited

U.S. PATENT DOCUMENTS

| 4,734,931 | * | 3/1988 | Bourg et al. | 379/94 |
|---|---|---|---|---|
| 4,797,911 | * | 1/1989 | Szalm et al. | 379/92 |
| 4,899,377 | * | 2/1990 | Bauer et al. | 340/712 |
| 5,063,600 | | 11/1991 | Norwood | 382/13 |
| 5,065,309 | | 11/1991 | Putnam et al. | 364/419 |
| 5,202,828 | * | 4/1993 | Vertelney et al. | 395/326 |
| 5,214,756 | * | 5/1993 | Franklin et al. | 395/161 |
| 5,237,651 | * | 8/1993 | Randall | 345/179 |
| 5,446,882 | * | 8/1995 | Capps et al. | 395/615 |

FOREIGN PATENT DOCUMENTS

| 259814 | 2/1990 | (JP) . |
|---|---|---|
| 273483 | 3/1990 | (JP) . |

OTHER PUBLICATIONS

Fukumaga et al., "Development of Workstation with High–Level Man–Machine Interface", Hitachi Review, vol. 68, No. 2, 1986–2, pp 37–40.

Kanagawa et al., "Future Office Desk", Sanyo Technical Review, vol. 24, No. 3, Dec. 1992, pp 60–67.

* cited by examiner

*Primary Examiner*—Steven Saras
(74) *Attorney, Agent, or Firm*—Michaelson & Wallace; Peter L. Michaelson (57) ABSTRACT

In a telephone note-taking device, if a telephone icon 22 is designated on a screen 16 by a handwrite-input pen 21, a main control device 28 makes a party designating area 24 and a note-taking area 26 displayed on the screen 16 and start operating at the same time. If a party is inputted into the party designating area 24, a party designation control device 32 autodials the party.

9 Claims, 12 Drawing Sheets

TELEPHONE NOTE-TAKING DEVICE

CROSS REFERENCE TO RELATED APPLICATION

This application is a continuation of patent application serial number entitled "Telephone Note-Taking Device" filed on Mar. 10, 1993 as Ser. No. 08/029,186 now abandoned.

BACKGROUND OF THE INVENTION

1. Field of the Invention

This invention relates to a telephone note-taking device for inputting a note into a computer during a telephone call, particularly to a telephone note-taking device having a telephone note-taking faculty in a desk having a built in computer and telephone.

2. Description of the Related Art

There have been proposed so far desks which builds therein a number of business machines in order to improve work efficiency in an office. Such a desk is disclosed in Japanese Published Patent Application No. 3-263850, for example.

In such a desk, there is an idea that plural business machines are ergonomically combined for high efficiency office work.

One idea is, for instance, that the desk is provided with an input unit of a computer so as to input a note by the input unit during a phone call, instead of memo paper.

Here, a telephone note-taking device for inputting a note during a phone call into a computer has been proposed and known already. Such a telephone note-taking device is shown, e.g. in a Patent Publication No. 3-75110 (Intl. Cl. H04M11/00).

This device starts an operation of a note-taking faculty of a Japanese computer in response to a start of sending and receiving of a phone call.

Moreover, the device retrieves and displays data related to a called party when the party is specified.

As a manner of general use of a telephone note-taking, subjects are itemized on notepaper prior to a phone call.

However, the above note-taking device cannot cope with this manner of use i.e., permit note-taking prior to making the phone call.

SUMMARY OF THE INVENTION

In view of the above, it is an object of the invention to provide a telephone note-taking device that makes it possible to take notes before a phone call.

It is another object of the invention to provide a telephone note-taking device that is capable of calling contents of notes on a screen on demand, if necessary.

In accordance with one preferred mode of a telephone note-taking device, for taking notes in a phone call, of the invention, a user can select a telephone using mode via a selecting means. If the user selects the telephone using mode via, a party designating/inputting means starts operating. On the other hand, a note inputting means starts operating at the same time as the party designating/inputting means. Input data of notes from the note inputting means are stored in a storing means. The input data of notes are displayed on a note displaying means.

In accordance with another preferred mode of a telephone note-taking device of the invention, a note-taking area for taking notes is displayed on a screen, automatically responding to sending and receiving of a phone call. The note-taking area is displayed on demand upon the screen by operation of a selecting means.

Further objects and advantages of the invention will be apparent from the following description, reference being had to the accompanying drawings, wherein preferred embodiments of the invention are clearly shown.

DETAILED DESCRIPTION OF THE PREFERRED EMBODIMENTS

Referring to FIGS. 1 to 6, wherein like reference characters designate like or corresponding parts throughout the several views, one preferred mode of a telephone note-taking device of the invention will be described hereafter.

Figure 1:
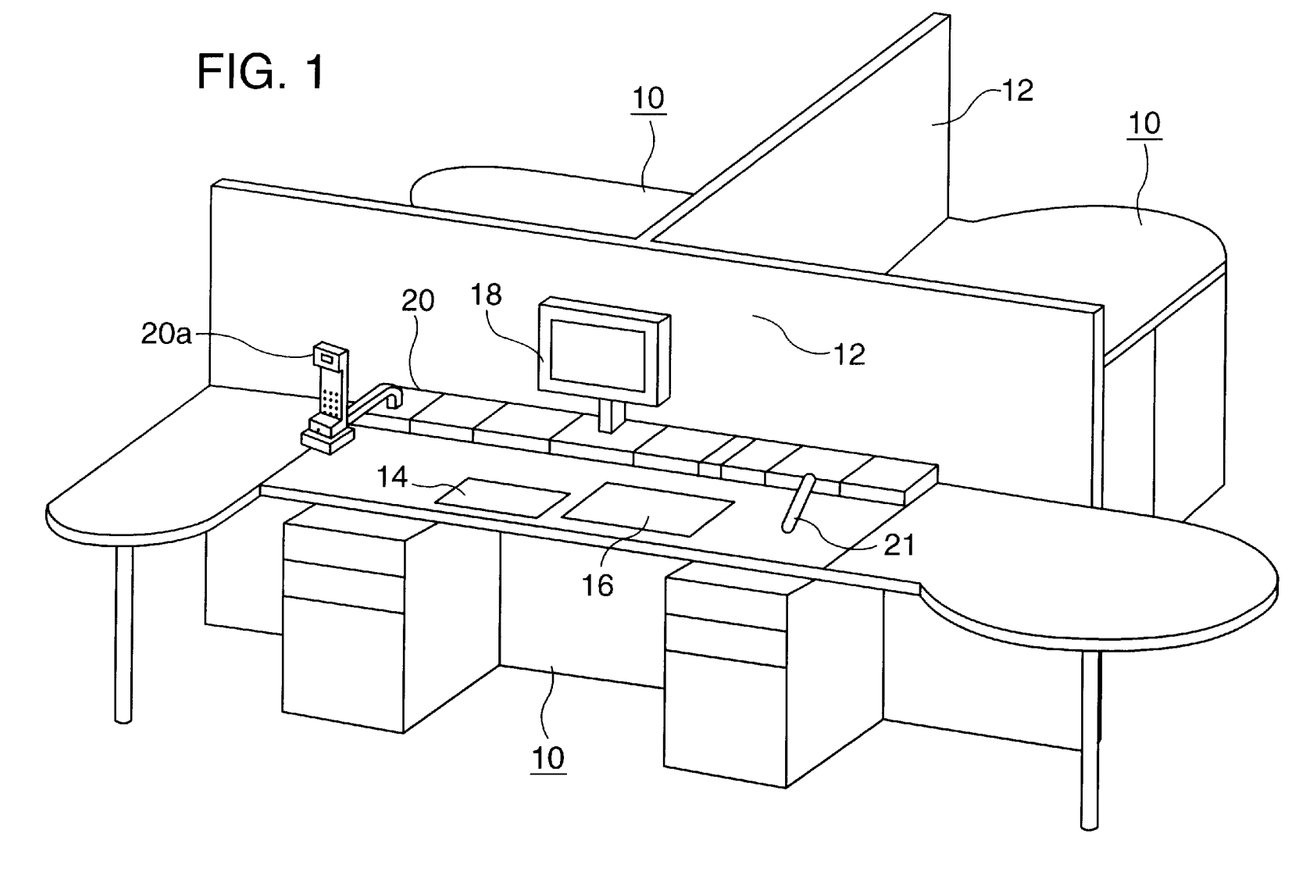
FIG. 1 is a schematic view showing a desk provided with one embodiment of a telephone note-taking device of the invention.

A desk of FIG. 1 is a type which has its surface embedded with liquid crystal display (LCD) tablets 14 and 16 for handwritten input and display. Such desks, which have a surface built in with a handwritten input device, are well-known to those skilled in the art. Moreover, an input-output unit, which layers a handwriting input tablet and a display on each other, is shown in a Japanese Published Patent Application No. 2-73483 (GO6K 9/00). Furthermore, desks having a top panel embedded with such an input-unit-integrated display have been shown already in "Development of Workstation with High-Level Man-Machine Interface" which is written by Fukunaga et al. of "Hitachi Review, Vol. 68, No. 2, 1986-2, pp. 37–40".

FIG. 1 illustrates an appearance of the desk.

In FIG. 1, the desks 10 are divided into each area by partitions 12. The LCD tablets 14 and 16 are embedded into a top panel of the desk 10.

The LCD tablet 14, 16 defines a pen-type input device as well as a display device.

A liquid crystal display unit 18 is arranged at a fixed position of the desk 10. A detachable telephone unit 20 having a telephone 20a is disposed on another fixed position of the desk 10.

It is possible to input characters or the like into the LCD tablet 14, 16 by a handwrite-input pen 21.

The LCD tablet 14, 16 is an input part and a display part of a computer which is built in a desk 10. The computer is connected to the telephone unit 20, too.

Figure 2:
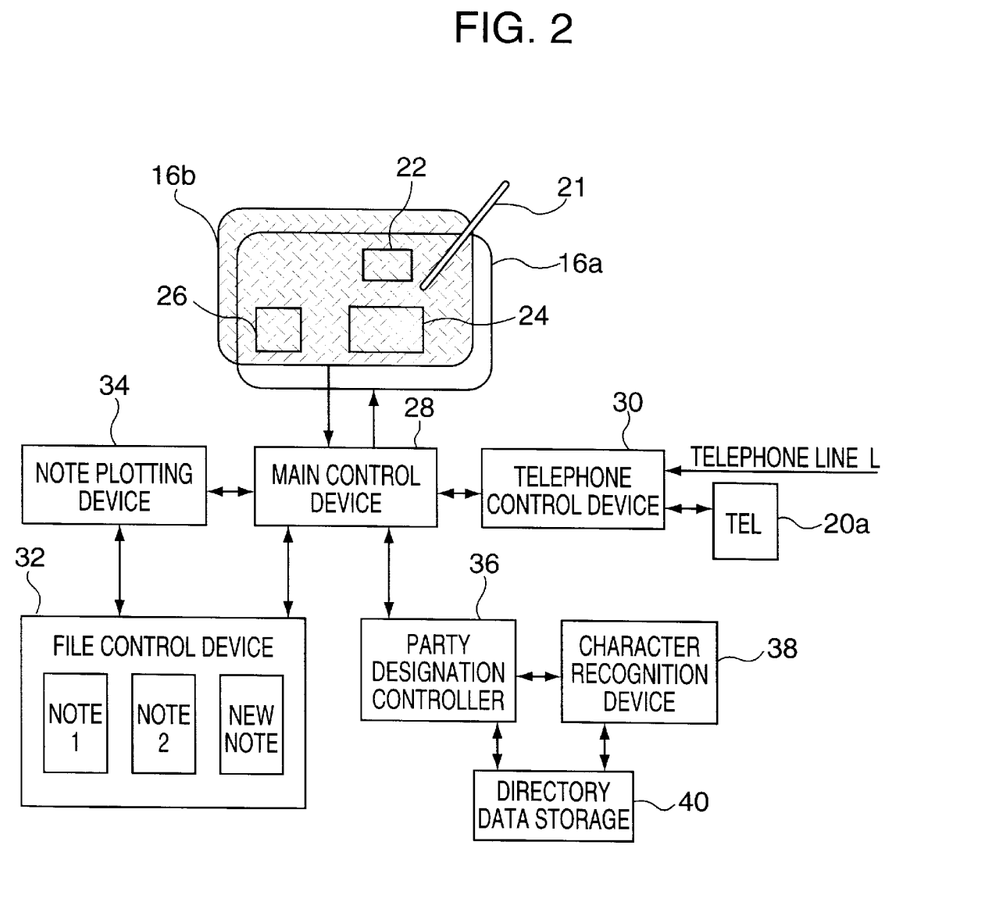
FIG. 2 is a block diagram of one embodiment of a telephone note-taking device of the invention.

FIG. 2 shows functional blocks of the telephone note-taking device.

In FIG. 2, the LCD tablet 16 is composed of a liquid crystal display 16a as a note display means and a pressure sensitive tablet 16b.

A telephone icon 22 as a selecting means is displayed on the LCD tablet 16. Any area of the LCD tablet 16 forms an input means for a pen-input on the digitizing tablet 16b, such as the telephone icon 22. At the same time, any area of the LCD tablet 16 constitutes a display output means for a display on the liquid crystal display 16a.

The LCD tablet 16 displays a party designating area 24 as a party designating/inputting means and a first note-taking area 26 as a note inputting means.

The LCD tablet 16 is connected with a main control device 28. The main control device 28 is actually a computer main frame, and is normally controlled by a program as a workstation.

A telephone control device 30 is connected to the main control device 28. The telephone control device 30 is connected with the telephone 20a and a telephone line L. It executes a detection of reception of a phone call, a phone transmission like autodial, a detection of this transmission, a detection of pickup of a receiver, etc.

A file control device 32 is connected with the main control device 28. The file control device 32 defines a storing means which stores contents of notes.

A note plotting device 34 is connected to the main control device 28 and the file control device 32. The note plotting device 34 translates a handwrite-pen input, which is inputted into the first note-taking area 26 of the LCD tablet 16, into data.

A party designation control device 36 is connected with the main control device 28.

A character recognition device 38 is connected with the party designation control device 36. The character recognition device 38 recognizes characters of the handwrite-pen input that are inputted into the LCD tablet 16.

A directory data storage 40 is connected to the party designation control device 36 and the character recognition device 38. The directory data storage 40 stores personal data such as names and telephone numbers thereof.

The party designation control device 36 receives data inputted by handwriting into the party designating area 24 of the LCD tablet 16 through the main control device 28. Then control device 36 inputs the handwrite-input data into the character recognition device 38. The character recognition device 38 recognizes this input to read a name of a designated party, and retrieves the directory data storage 40 by use of the name. The directory data storage 40 outputs data of telephone numbers. These data are inputted into the telephone control device 30 via the party designation control device 36 and the main control device 28. Thus the telephone control device 30 executes an autodialing operation.

Figure 3:
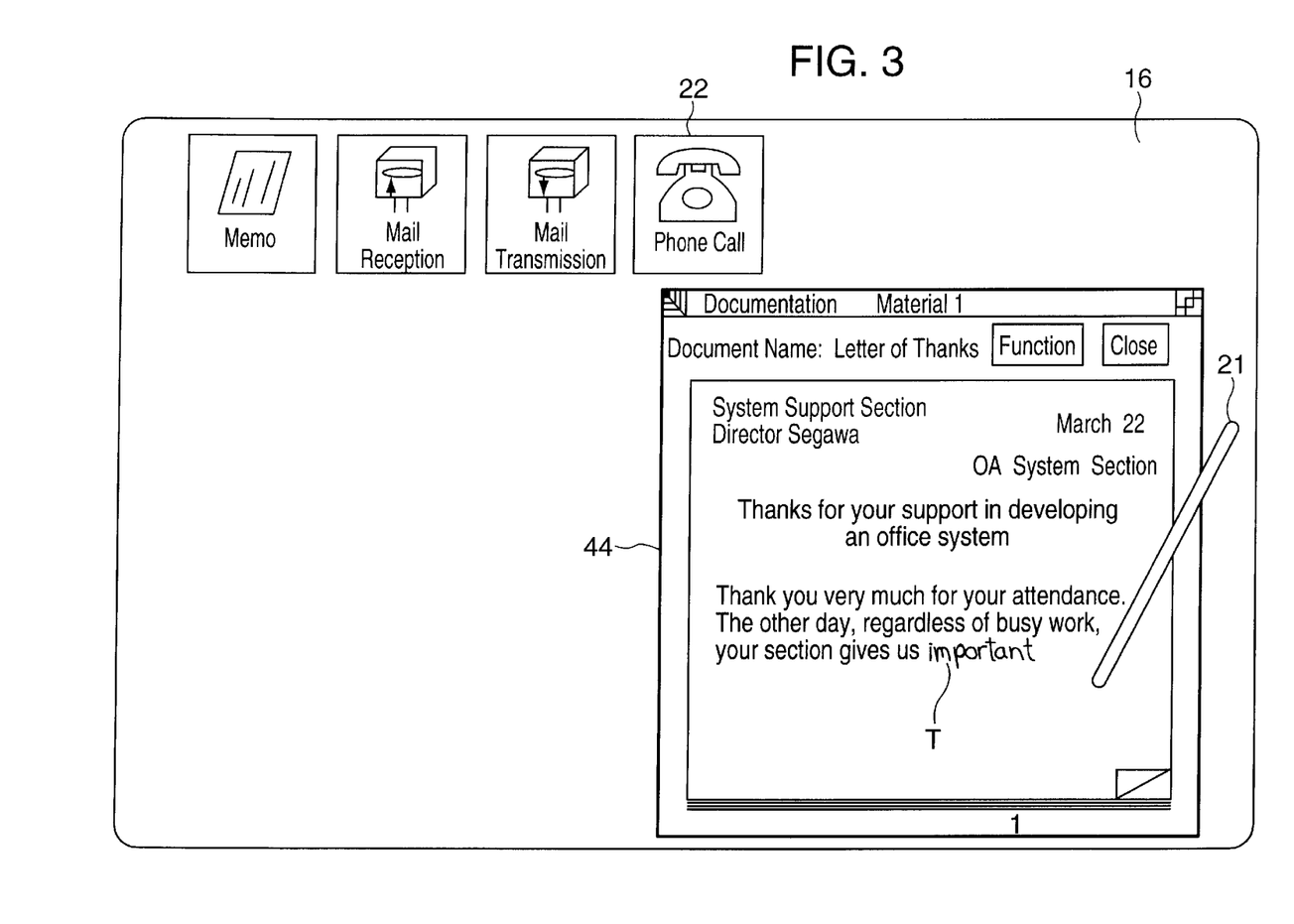
FIG. 3 is a view of a screen for explaining an operation of a calling side of one embodiment of a telephone note-taking device of the invention.

FIG. 3 illustrates a screen of the LCD tablet. A work area 44 is displayed on the screen.

Next, a transmitting operation is described with respect to the device of the present embodiment.

FIGS. 3 to 6 show a transition of contents displayed on the screen of the LCD tablet 16.

As shown in FIG. 3, the screen of the LCD tablet 16 displays thereon the telephone icon 22, by which a telephone using mode is selectable, and the work area 44. A user creates and edits documents in the work area 44 by the handwrite-input pen 21.

Figure 4:
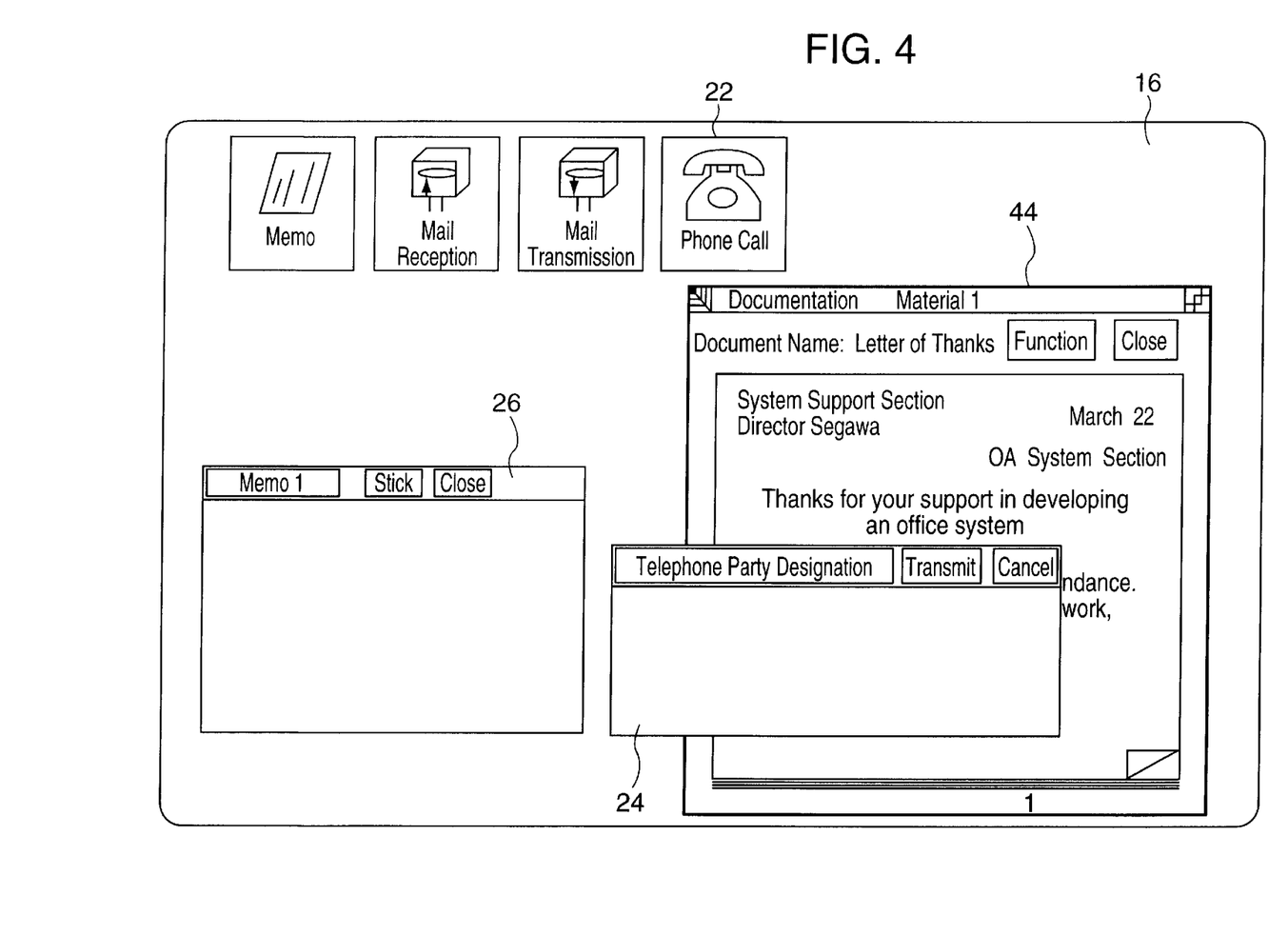
FIG. 4 is a view of a screen for explaining an operation of a calling side of one embodiment of a telephone note-taking device of the invention.
Figure 5:
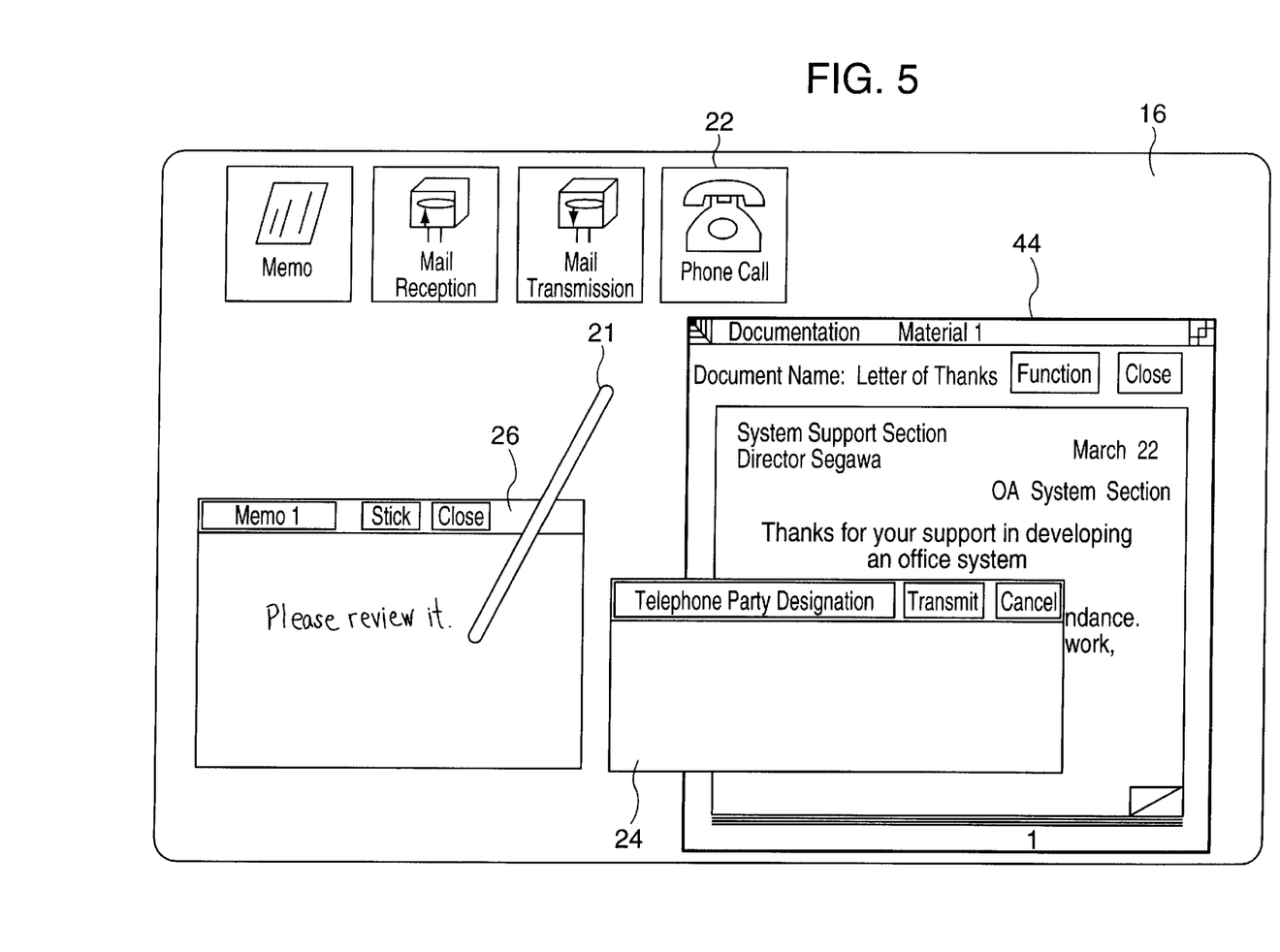
FIG. 5 is a view of a screen for explaining an operation of a calling side of one embodiment of a telephone note-taking device of the invention.

Thereafter, when the user touches the telephone icon 22 by the handwrite-input pen 21 to designate the telephone using mode, as shown in FIG. 4, the main control device 28 makes the screen of the LCD tablet 16 display the party designating area 24 and the first note-taking area 26. Simultaneously, the main control device 28 creates a new note file in the file control device 32, and passes a file name thereof to the note plotting device 34.

Thus, it is possible to input a note in the first note-taking area 26 by the handwrite-input pen 21.

The note plotting device 34 executes plotting and displaying of handwriting on the basis of coordinate data handwritten on the first note-taking area 26. Moreover, the note plotting device 34 stores handwritten coordinates in a note file of the file control device 32.

Figure 6:
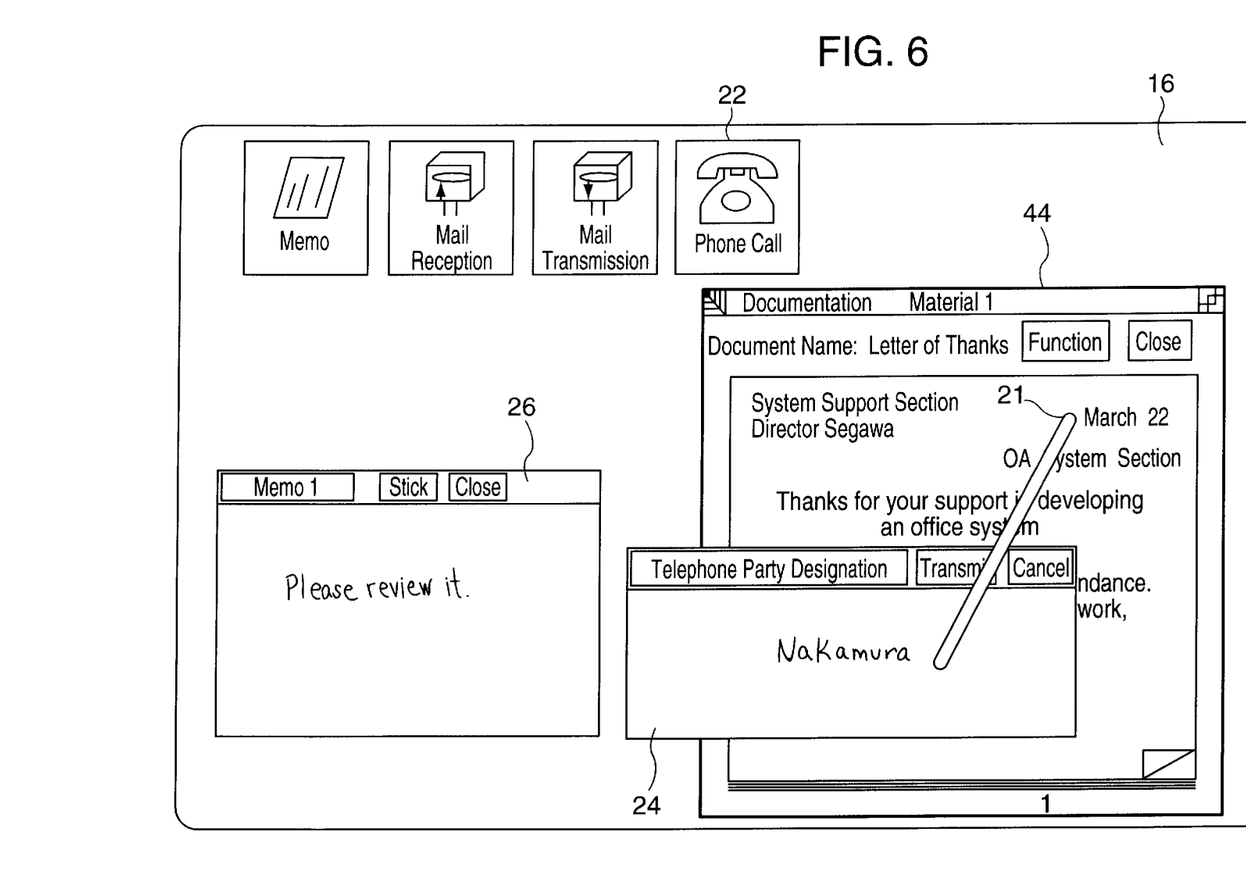
FIG. 6 is a view of a screen for explaining an operation of a calling side of one embodiment of a telephone note-taking device of the invention.
Figure 7:
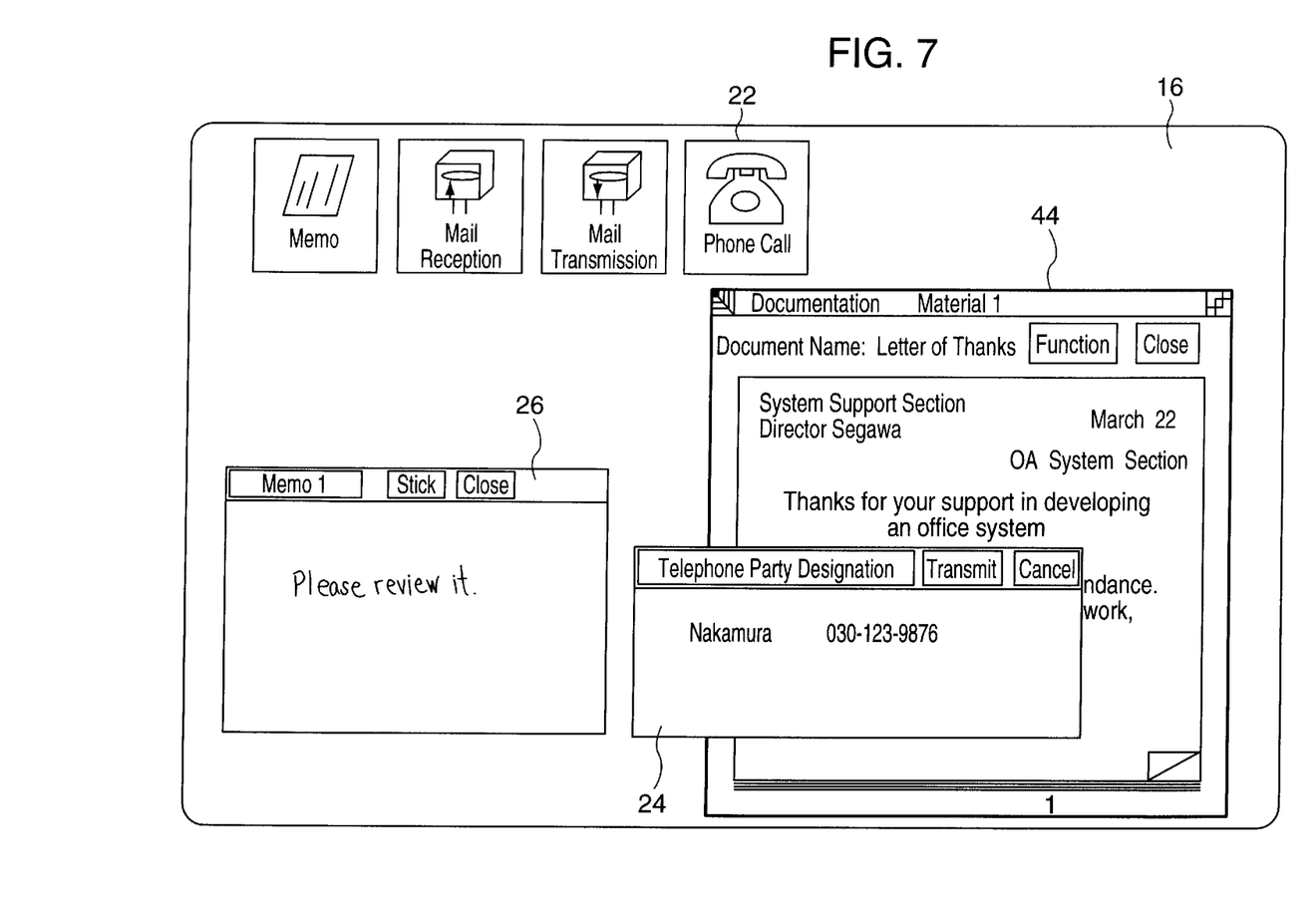
FIG. 7 is a view of a screen for explaining an operation of a calling side of one embodiment of a telephone note-taking device of the invention.

Thereafter, a name of a designated party is inputted by handwriting in the party designating area 24 using the handwrite-input pen 21, as shown in FIG. 6. The party designation control device 36 recognizes characters handwritten in the party designating area 24 by use of the character recognition device 38. As a result, printed characters corresponding to the handwriting are displayed on the party designating area 24, as shown in FIG. 7. The party designation control device 36 procures a corresponding telephone number from the directory data base 40 and autodials the number.

The party is rung up by this autodialing. The first note-taking area 26 functions during a telephone conversation.

Namely, the user can make a phone call while looking at businesses or subjects inputted in the first note-taking area 26 before ringing up the party. Moreover, the user can add a new memo in the first note-taking area 26 while talking.

Figure 8:
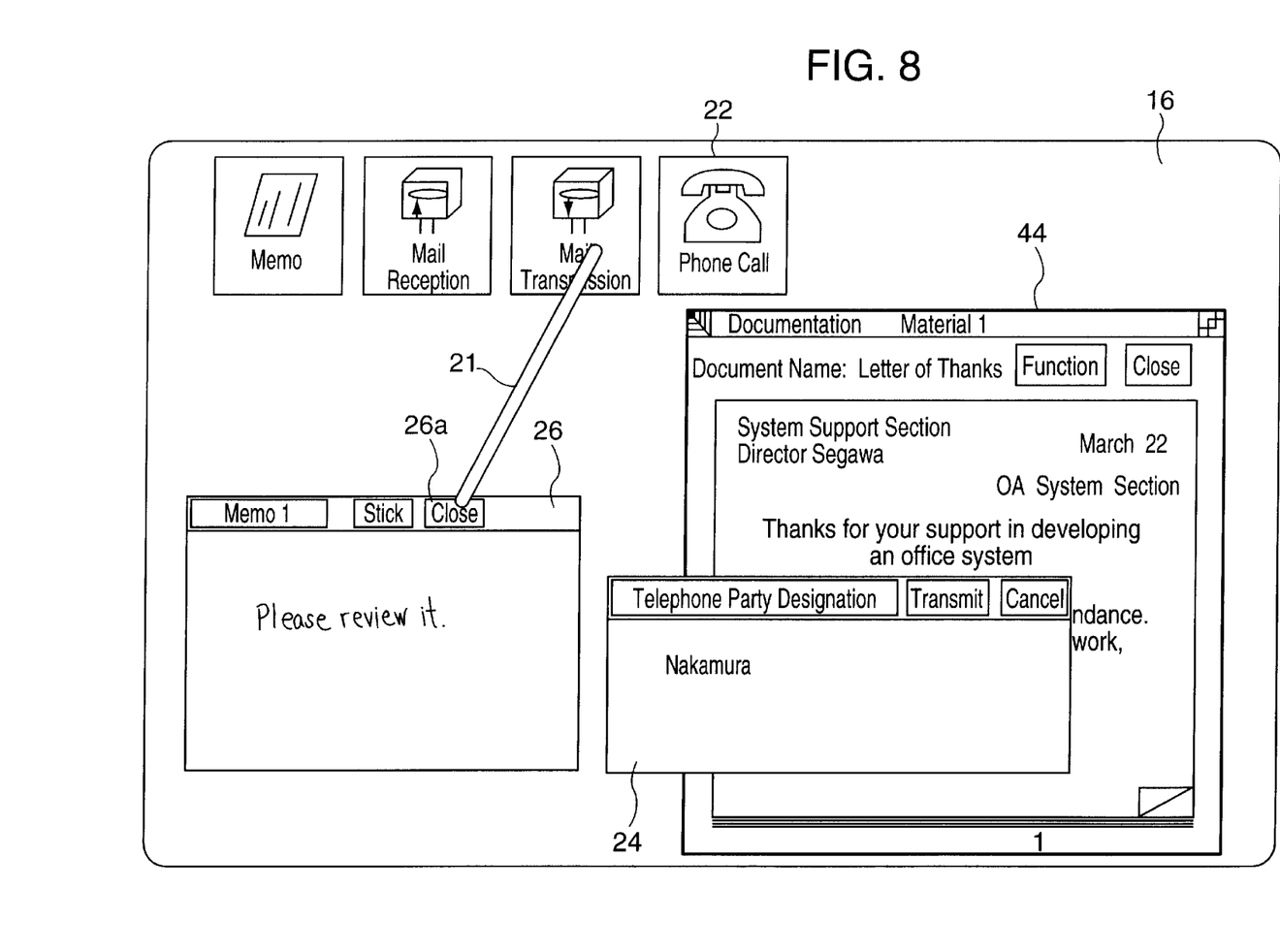
FIG. 8 is a view of a screen for explaining an operation of a calling side of one embodiment of a telephone note-taking device of the invention.

The first note-taking area 26 can be closed if a close icon 26a is designated by the handwrite-input pen 21, as shown in FIG. 8. Thus storing of handwritings in the first note-taking area 26 is finished, and the memo display (the display itself in the memo paper) is deleted.

The stored notes can be invoked when necessary, by designating a memo icon by the handwrite-input pen 21 so as to select a memo menu.

Next, a receiving operation is described with respect to the device of the present embodiment.

Figure 9:
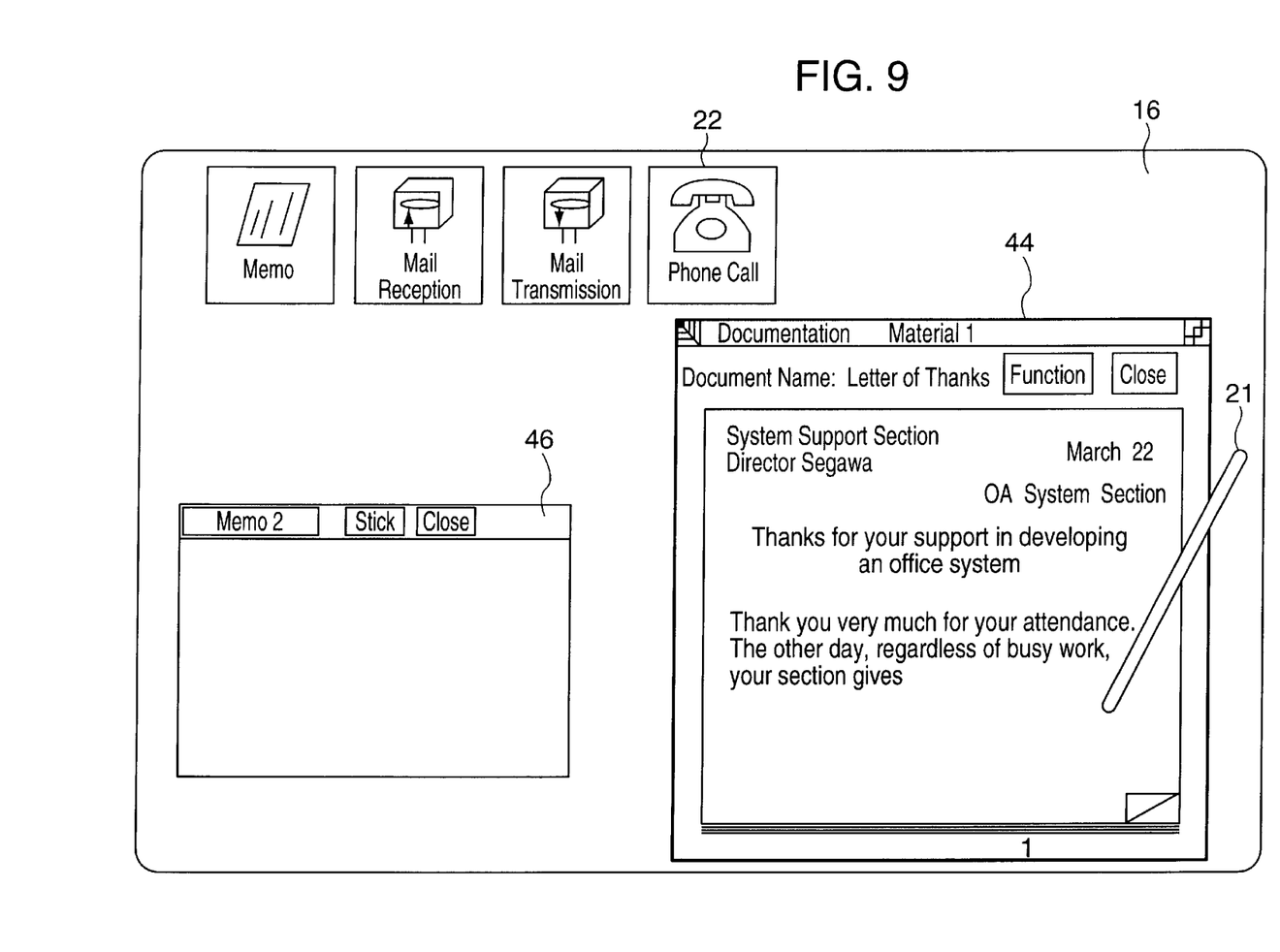
FIG. 9 is a view of a screen for explaining an operation of a called side of one embodiment of a telephone note-taking device of the invention.

If there is a phone call and a user picks up the handset of the telephone 20a, a hook information of "picking up of handset" is outputted from the telephone control device 30. Consequently, the main control device 28 makes a second note-taking area 46 displayed on the screen, as shown in FIG. 9.

A sequence of operations mentioned above are carried out according to a program control of the main control device 28.

Figure 10:
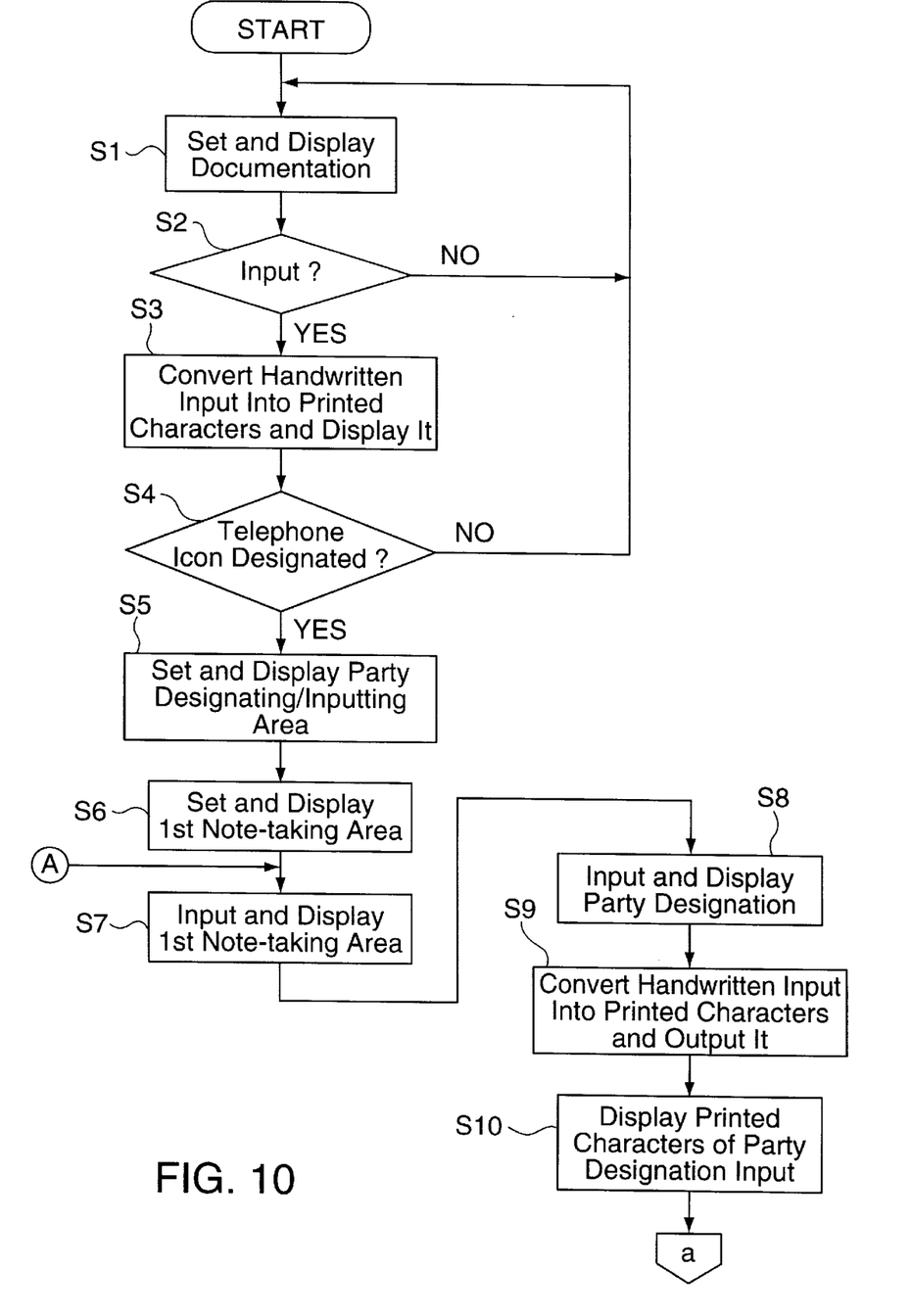
FIG. 10 and FIG. 11 are collectively a flowchart of a transmitting routine of one embodiment of a telephone note-taking device of the invention.
Figure 11:
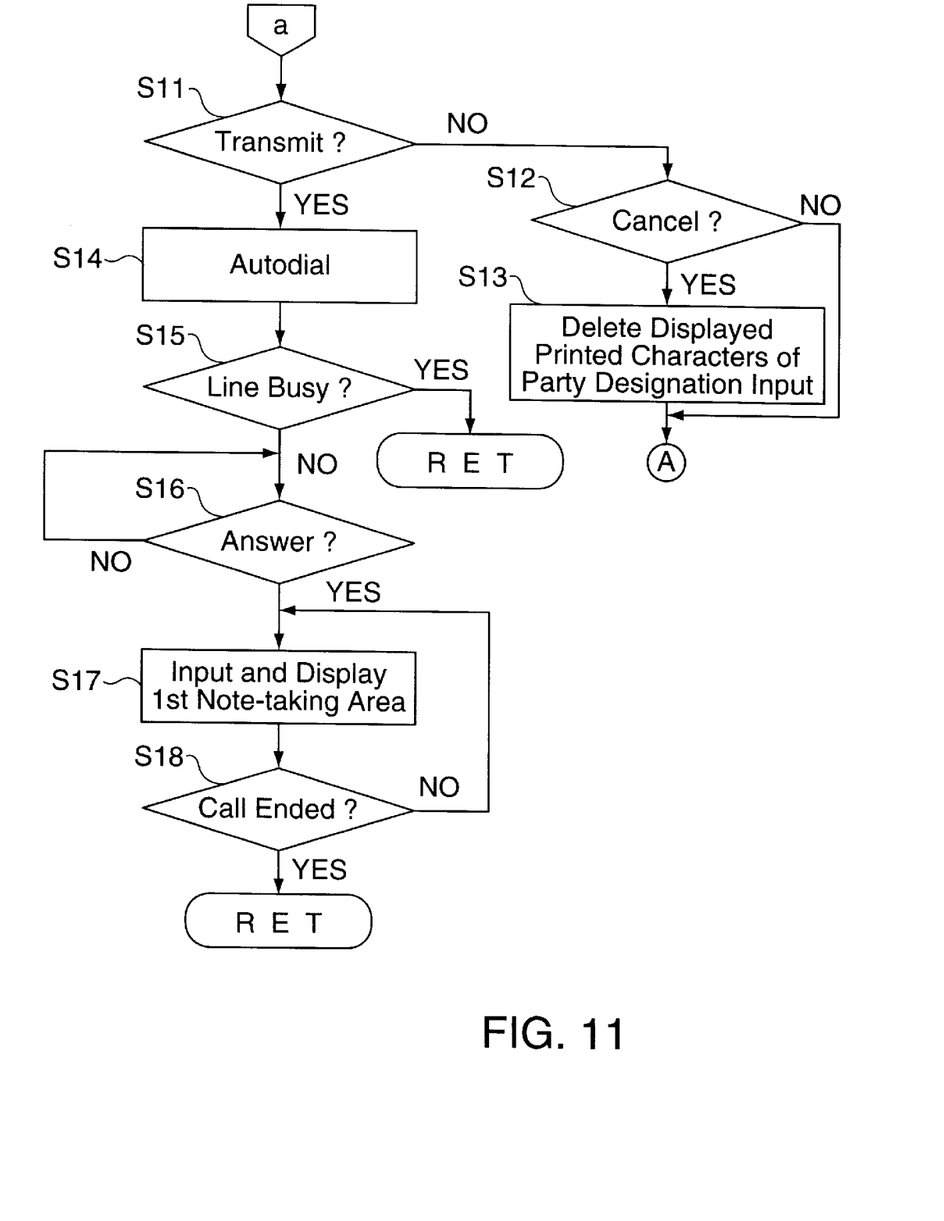

Next, a transmitting routine of the present embodiment of the telephone note-taking device will be described referring to a flowchart of FIG. 10 and FIG. 11.

Usually, the telephone note-taking device runs a routine from a step S1 to a step S4 by a function as a workstation. Here, the step S1 in the present embodiment defines a word processor function that executes a setting and display of documentation. When characters or the like are inputted into the LCD tablet 16 by the handwrite-input pen 21, they are transmitted to the character recognition device 38, and converted into printed characters and then displayed on the LCD tablet 16, in the step S3. In the step S4, it is judged whether the telephone icon 22 has been selected by the handwrite-input pen 21. The routine of the steps S1 to S4 is repeated until the telephone icon 22 is chosen as the selecting means of the present embodiment. If another icon is selected as a selecting means, a program not shown is executed.

When it is judged in the step S4 that the telephone icon 22 has been selected by the handwrite-input pen 21, the party designating area 24 and the first note-taking area 26 are set and displayed on the LCD tablet 16, respectively in a step S5 and a step S6.

In a step S7, if there is an input in the first note-taking area 26, such input as a drawing or a picture is displayed as it is. When a party has provided handwritten input on the party designating area 24 in a step S8, such handwritten input is inputted into the character recognition device 38, so that the character recognition device 38 recognizes the input and retrieves a name of the party from the directory data storage 40, in a step S9. In a step S10, data of the party and his or her telephone number that is selected from the directory data storage 40 are displayed.

It is judged in a step S11 if a "Transmit" of the party designating area 24 has been selected by the handwrite-input pen 21. When it has not been selected, it is judged in a step S12 if a "Cancel" of the party designating area 24 has been selected. When the "Cance" has been selected, the display of the data of the party and the telephone number that have been chosen from the directory data storage 40 are erased in a step S13. If the "Cancel" has not been chosen, the routine of the steps S7 to S12 is repeated as they are. Thereby, in case input data of the first note-taking area 26 increase, they are displayed as they are. The party and the telephone number can be corrected.

When the "Transmit" of the party designating area 24 is selected by the handwrite-input pen 21 in the step S11, the telephone control device 30 autodials in a step S14. If the party is on another call, i.e. the telephone of that party is busy, the above routine is exited in a step S15. As a matter of course, it is possible to provide a redial function.

When the party answers the phone in a step S16, the first note-taking area 26 is kept displaying input as it is, if any, until the phone call is finished and the telephone line is disconnected, in steps S17 and S18. This mode is canceled if the call ends and the line is cut off.

Figure 12:
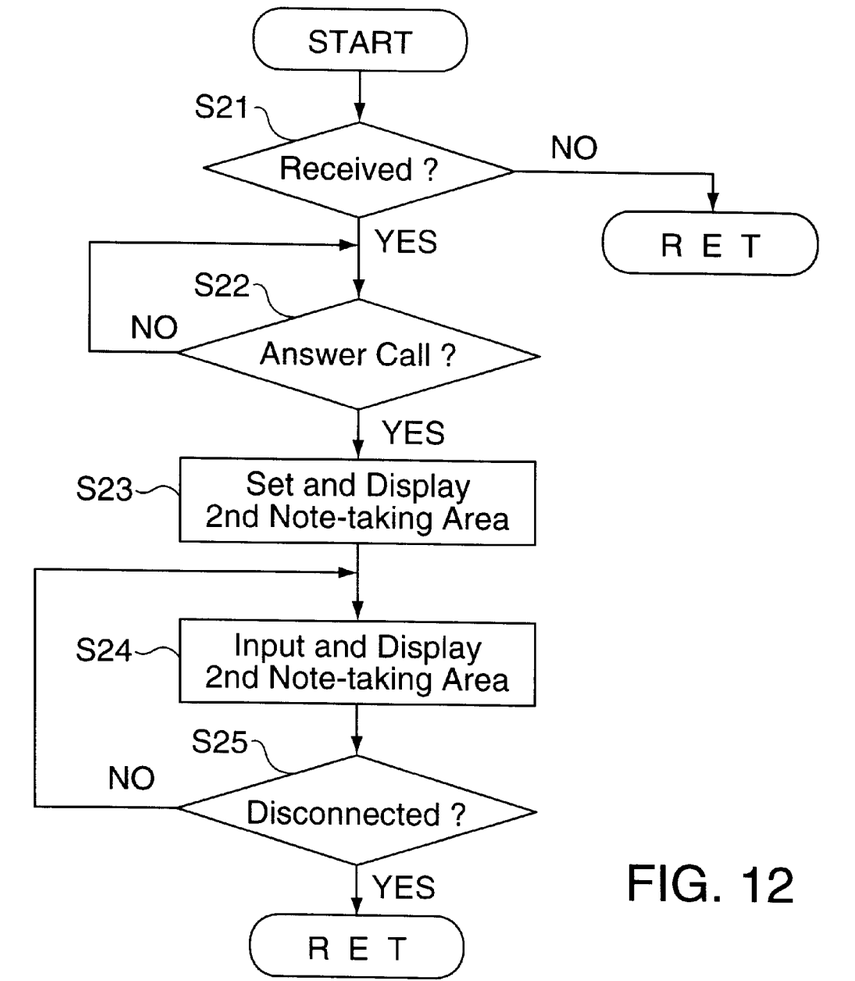
FIG. 12 is a flowchart of a receiving routine of one embodiment of a telephone note-taking device of the invention.

Next, a receiving routine of the embodiment of the telephone note-taking device is described referring to a flow chart of FIG. 12.

This routine is called at predetermined short intervals while the main routine is executed. If it is judged in a step S21 that there is no phone call, the receiving routine is exited immediately. If it is confirmed that there is a phone call in the step S21 and if the user picks up the handset in a step S22, a hook information is outputted into the telephone control device 30, and the main control device 28 sets the second note-taking area 46 and, as shown in FIG. 9, displays it on the tablet 16 in a step S23. Any input in the second note-taking area 46 remains displayed as it is in a step S24, until the phone call is finished and the line is cut off in a step S25. If the call ends and the line is disconnected, this mode is canceled.

While the handwrite-input pen 21 is used for the input means in the above embodiment, alternatively other input means such as a key board or a mouse may be used. Moreover, an arrangement of each area in the screen 16 or the like may be changed as desired, as long as it is possible to prepare notes on the screen 16 before a phone call.

The preferred embodiment described herein is therefore illustrative and not restrictive, the scope of the invention being indicated in the appended claims and all variations which come within the meaning of the claims are intended to be embraced therein.

What is claimed is:

1. A telephone note-taking device, adapted to take notes from a user before the user places an outgoing telephone call through the telephone note-taking device, comprising:

selecting means, responsive to user selection, for enabling the user to select a telephone using mode through which, when selected, the telephone note-taking device is instructed to accept notes to be entered by the user and subsequently, upon a further command from the user, initiate an outgoing telephone call to a called party;

party designating/inputting means, responsive to said selecting means, for enabling the user to designate the called party to which the telephone call is to be directed, wherein the party designating/inputting means begins operation when the user selects the telephone using mode via the selecting means;

transmitting means, operative in conjunction with said selecting means and responsive to the further command from the user, for initiating the outgoing telephone call between the user and the called party, said further command being separate from and subsequent to the user selection of the telephone using mode;

note inputting means for accepting the notes entered by the user before the outgoing telephone call is initiated, said note inputting means automatically commencing operation, so as to accept the notes, sequentially after the party designating/inputting means starts operation but before the user, through the selecting means, commands the device means to initiate the telephone call;

storing means, connected to said note inputting means, for storing said notes entered via the note inputting means; and note displaying means, connected to the note inputting means, for displaying the notes to the user as the notes are entered thereby.

2. A telephone note-taking device comprising:

selecting means, responsive to user selection, for enabling the user to select, on demand, a mode through which, when selected, the telephone note-taking device will accept notes to be entered by the user and subsequently, upon a further command from the user, initiate an outgoing telephone call to a called party;

party designating/inputting means, responsive to said selecting means, for enabling the user to designate the called party to which the telephone call is to be directed, wherein the party designating/inputting means begins operation when the user selects said mode via the selecting means;

transmitting means, operative in conjunction with said selecting means and responsive to the further command from the user, for initiating the outgoing telephone call between the user and the called party, said further command being separate from and subsequent to the user mode selection; and note inputting means that automatically displays a note-taking area for accepting the notes entered by the user before the further command to initiate the outgoing call to the called party.

3. A telephone note-taking device comprising:

inputting means for controlling operation of the device;

an input-faculty-integrated display, responsive to said inputting means, including a note-taking area for inputting and displaying notes entered via the inputting means, a party-designating area for inputting and displaying a party designation and a telephone icon for commanding a telephone using mode, wherein designation of said telephone icon, by a user through said inputting means, instructs said device to accept and display the notes entered in the note-taking area and to subsequently, through a separate designation from the user and entered within the party-designating area, initiate an outgoing telephone call to a called party designated by the user in the party-designating area;

first control means for controlling display of the note-taking area and the party designating area on the input-faculty-integrated display, wherein the first control means begins operation whenever the telephone icon is designated by the user such that said note-taking area and said party-designating area are displayed and the user can enter the notes into the note-taking area before the outgoing telephone call is initiated; and second control means, responsive to said separate designation, for autodialing the called party so as to initiate the telephone call.

4. A telephone note-taking device according to claim 3, wherein the inputting means is a handwriting-input pen and the input-faculty-integrated display has a tablet for accepting handwritten information entered using the handwriting-input pen.

5. A telephone note-taking device according to claim 4, wherein the first control means includes a file control device for storing contents of the notes inputted into the note-taking area and a main control device for preparing a note file in the file control device while displaying the note-taking area on the input-faculty-integrated display.

6. A telephone note-taking device according to claim 5, wherein the main control device displays the note-taking area on the input-faculty-integrated display when a user picks up a telephone receiver in response to an incoming phone call.

7. A telephone note-taking device, adapted to take notes from a user and before the user places an outgoing telephone call through the telephone note taking device, comprising:

selecting means, responsive to user selection, for enabling the user to select a telephone using mode through which, when selected, the device is instructed to accept notes to be entered by the user and subsequently, upon a further command from the user, initiate an outgoing telephone call to a called party;

party designating/inputting means, responsive to said selecting means, for enabling the user to designate the called party to which the telephone call is to be directed, wherein the party designating/inputting means begins operation when the user selects the telephone using mode via the selecting means;

transmitting means, operative in conjunction with said selecting means and responsive to the further command from the user, for initiating the outgoing telephone call between the user and the called party, said further command being separate from and subsequent to the user selection of the telephone using mode;

note inputting means for accepting the notes entered by the user before the outgoing telephone call is initiated, said note inputting means automatically commencing operation, so as to accept the notes, sequentially after the party designating/inputting means starts operation but before the user, through the selecting means, commands the device means to initiate the telephone call, wherein corresponding display areas associated with said party designating/inputting means and said note inputting means are both displayed on a common screen and made active at the same time;

storing means, connected to said note inputting means, for storing said notes entered via the note inputting means; and note displaying means, connected to the note inputting means, for displaying the notes to the user as the notes are entered thereby.

8. A computer implemented telephone note-taking device comprising:

a) a first display means including a telephone mode command icon, the telephone mode command icon including:
   i) means for displaying the telephone mode command icon; and
   ii) means for selecting the telephone mode command icon; and b) a second display means, invoked upon selection of the means for selecting the telephone mode command icon, the second display means including:
   i) a note taking window having
      A) means for displaying the note taking window upon selection of the means for selecting the telephone mode command icon,
      B) a pre-call mode for entering notes within the note taking window before a call is made, and
      C) a call-period mode for entering notes within the note taking window during a call; and
   ii) a party designation window having
      A) means for displaying the party designation window upon selection of the means for selecting the telephone mode command icon,
      B) a name entry mode for handwritten entry of a name of a party to be called,
      C) means for displaying the name of the party to be called and an associated telephone number, and
      D) means for auto-dialing the associated telephone number displayed by the means for displaying.

9. The device of claim 8 wherein the note taking window further includes means for retrieving stored messages during a call.

* * * * *